United States Patent
Choi et al.

(10) Patent No.: US 8,801,905 B2
(45) Date of Patent: Aug. 12, 2014

(54) THERMOCHROMIC SUBSTRATE AND METHOD OF MANUFACTURING THE SAME

(75) Inventors: Yongwon Choi, ChungCheongNam-Do (KR); Yung-Jin Jung, ChungCheongNam-Do (KR); Donggun Moon, ChungCheongNam-Do (KR); Jeeyun Cha, ChungCheongNam-Do (KR)

(73) Assignee: Samsung Corning Precision Materials Co., Ltd., Gumi-Si, Gyeongsangbuk-Do (KR)

( * ) Notice: Subject to any disclaimer, the term of this patent is extended or adjusted under 35 U.S.C. 154(b) by 1 day.

(21) Appl. No.: 13/446,699

(22) Filed: Apr. 13, 2012

(65) Prior Publication Data
US 2013/0150238 A1  Jun. 13, 2013

(30) Foreign Application Priority Data
Dec. 8, 2011  (KR) .................. 10-2011-0131219

(51) Int. Cl.
*C03C 17/34* (2006.01)
(52) U.S. Cl.
CPC .................................. *C03C 17/3417* (2013.01)
USPC .................. 204/192.26; 427/350; 359/288
(58) Field of Classification Search
CPC ............ C03C 17/3417; C03C 17/3423; C03C 2217/218; C03C 2217/322; E06B 3/6722
USPC .................. 204/192.26; 427/350; 359/288
See application file for complete search history.

(56) References Cited

U.S. PATENT DOCUMENTS

2005/0147825 A1  7/2005  Arnaud et al.
2011/0164306 A1*  7/2011  Shim et al. ................... 359/289

FOREIGN PATENT DOCUMENTS

GB   2114965      9/1983
JP   2000-137251  5/2000

OTHER PUBLICATIONS

Jin et al., "Formation and Thermochromism of VO2 Films Deposited by RF Magnetron Sputtering at Low Substrate Temperature," Jpn. J. Appl. Phys. vol. 33 (1994) pp. 1478-1483, Part 1, No. 3A, Mar. 1994.
Cho et al., "Current-induced metal-insulator transition in VOx thin film prepared by rapid-thermal-annealing," Thin Solid Films 495 (2006) 375-379.
Extended European Search Report issued in European Application No. 12164255.7 dated Jun. 13, 2013.

* cited by examiner

*Primary Examiner* — Bruce H Hess
(74) *Attorney, Agent, or Firm* — McDermott Will & Emery LLP

(57) ABSTRACT

A thermochromic substrate and a method of manufacturing the same, in which the crystallinity of a thermochromic layer can be improved. The method includes the steps of forming a pre-thermochromic layer on a glass substrate by coating the glass substrate with pure vanadium, forming a seed layer by heat-treating the pre-thermochromic layer, and forming a thermochromic layer by coating the heat-treated seed layer with a vanadium dioxide ($VO_2$) thin film.

14 Claims, 4 Drawing Sheets

THERMOCHROMIC SUBSTRATE AND METHOD OF MANUFACTURING THE SAME

CROSS REFERENCE TO RELATED APPLICATION

The present application claims priority from Korean Patent Application Number 10-2011-0131219 filed on Dec. 8, 2011, the entire contents of which application are incorporated herein for all purposes by this reference.

BACKGROUND OF THE INVENTION

1. Field of the Invention

The present invention relates to a thermochromic substrate and a method of manufacturing the same, and more particularly, to a thermochromic substrate and a method of manufacturing the same, in which the crystallinity of a thermochromic layer can be improved.

2. Description of Related Art

Thermochromism refers to the phenomenon in which an oxide or a sulfide of a transition metal undergoes a change in its crystal structure below and above a specific temperature (i.e. transition temperature (Tc)), so that its physical properties (electrical conductivity and infrared (IR) transmittance) suddenly change.

When a glass is coated with a thin film that has such thermochromic capability, a "smart window" can be produced, which transmits visible light but blocks near infrared rays and infrared rays at a predetermined temperature or more in order to prevent the indoor temperature from increasing. The application of smart glass to windows of vehicles or buildings may be very effective in saving energy. Materials that exhibit thermochromism include oxides of several transition metals, of which vanadium dioxide ($VO_2$) is being studied since its transition temperature is 68° C., which is relatively close to a temperature that is practically applicable.

Accordingly, in order to manufacture vanadium oxides, which are present in a variety of crystalline phases, such as $V_2O_3$, $V_3O_5$, $V_4O_7$, $V_5O_9$, $V_6O_{11}$, $V_6O_{13}$, $V_4O_9$, $V_3O_7$, $V_2O_5$ and $VO_2$, into a crystalline phase of $VO_2$, a method of heating a glass substrate to a high temperature and then coating the glass substrate with a vanadium oxide, a method of coating a glass substrate with a vanadium oxide, followed by post annealing, and the like are used.

However, these methods have a problem in that, when a sodalime glass, which is generally used as a glass substrate, is coated with a vanadium oxide, the vanadium oxide would also be amorphous due to the amorphousness of the glass.

There is also a problem in that sodium (Na) ions inside the sodalime glass diffuse into the thermochromic layer at temperatures of 350° C. or higher, thereby degrading the characteristics of the thermochromic layer.

Accordingly, in the related art, an oxide- or nitride-based thin film is added between the glass substrate and the thermochromic layer. In this case, however, the substances that form the thermochromic layer are different from those that form the thin film, thereby degrading the crystallinity of the thermochromic layer. In addition, the process of forming the thermochromic layer becomes difficult.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a method of manufacturing a thermochromic substrate, by which the thermochromic substrate has excellent crystallinity and excellent thermochromic characteristics.

In an aspect of the present invention, provided is a thermochromic substrate, including a base substrate, a seed layer formed on the base substrate, and a thermochromic layer formed on the seed layer. The thermochromic layer contains a thermochromic substance, and the seed layer is modified such that at least a surface thereof facing the thermochromic layer contains the thermochromic substance.

In an exemplary embodiment, the thermochromic substance may have a composition expressed by $AxBy$, and the surface of the seed layer may be modified from $AxBz$ into the $AxBy$, where A is a metal element, and $y>z$.

In an exemplary embodiment, the $AxBy$ may be titanium oxide (III) ($Ti_2O_3$), niobium oxide ($NbO_2$) or nickel sulfide (NiS).

Here, A may be vanadium (V), and B may be oxygen (O).

In addition, x may be a natural number, y may be 2x, and z may be 0 or 2x−1. In an example, $AxBz$ may be one selected from among, but not limited to, V, $V_2O_3$, $V_3O_5$, $V_4O_7$, $V_5O_9$ and $V_6O_{11}$.

In an exemplary embodiment, the thickness of the seed layer may range from 5 nm to 10 nm.

In another aspect of the present invention, also provided is a method of manufacturing the foregoing thermochromic substrate. The method includes the steps of: forming a pre-thermochromic layer on the base substrate, the pre-thermochromic layer including a composition of $AxBz$; forming the seed layer by heat-treating the pre-thermochromic layer, the seed layer being modified such that at least the surface thereof includes a composition of $AxBy$; and forming the thermochromic layer on the seed layer.

In an exemplary embodiment, A may be vanadium (V), and B may be oxygen (O).

In an exemplary embodiment, z is 0, and at least the surface of the pre-thermochromic layer may be modified from the pure vanadium into the vanadium dioxide ($VO_2$) due to the pre-thermochromic layer being heat-treated.

In an exemplary embodiment, the thickness of the seed layer may range from 5 nm to 10 nm.

In an exemplary embodiment, the pre-thermochromic layer may be heat-treated in a vacuum atmosphere.

In an exemplary embodiment, the pre-thermochromic layer may be heat-treated while oxygen is being provided.

In an exemplary embodiment, the oxygen may be provided in an amount ranging from 10 sccm to 100 sccm.

In an exemplary embodiment, the pre-thermochromic layer may be heat-treated at a temperature ranging from 300° C. to 500° C.

In an exemplary embodiment, the pre-thermochromic layer may be heat-treated for 10 to 60 minutes.

In an exemplary embodiment, the $AxBy$ may be composed of vanadium dioxide ($VO_2$). The thermochromic layer composed of the $VO_2$ may be formed via sputtering deposition using a sputtering target made of pure vanadium or a vanadium oxide In an exemplary embodiment, the $AxBy$ may be composed of $VO_2$. The thermochromic layer composed of the $VO_2$ may be formed via direction current (DC) sputtering deposition using a sputtering target made of pure vanadium or vanadium dioxide ($VO_2$) with which vanadium trioxide ($V_2O_3$) and vanadium pentoxide ($V_2O_5$) are mixed In an exemplary embodiment, the pre-thermochromic layer may be formed at a temperature of 350° C. or less.

In a further aspect of the present invention, also provided is a method of manufacturing the foregoing thermochromic substrate. The method includes the steps of: forming a pre-thermochromic layer on the base substrate, the pre-thermochromic layer including a composition of AxBz; forming the seed layer by oxidizing the pre-thermochromic layer, the seed layer being modified such that at least the surface thereof includes a composition of AxBy; and forming the thermochromic layer on the seed layer.

In an exemplary embodiment, the AxBy may be titanium oxide (III) ($Ti_2O_3$), niobium oxide ($NbO_2$) or nickel sulfide (NiS).

In still another aspect of the present invention, also provided is a method of manufacturing the foregoing thermochromic substrate. The method includes the steps of: forming a pre-thermochromic layer on the base substrate, the pre-thermochromic layer including a composition of AxBz; forming the seed layer by sulfiding the pre-thermochromic layer, the seed layer being modified such that at least the surface thereof includes a composition of AxBy; and forming the thermochromic layer on the seed layer.

In an exemplary embodiment, the AxBy may be nickel sulfide (NiS).

According to embodiments of the invention, it is possible to improve the crystallinity and the long-term reliability of the thermochromic layer.

In addition, it is possible to prevent sodium from diffusing from the glass substrate, thereby improving the thermochromic characteristics of the thermochromic layer.

Furthermore, it is possible to simplify the process of manufacturing a thermochromic substrate.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
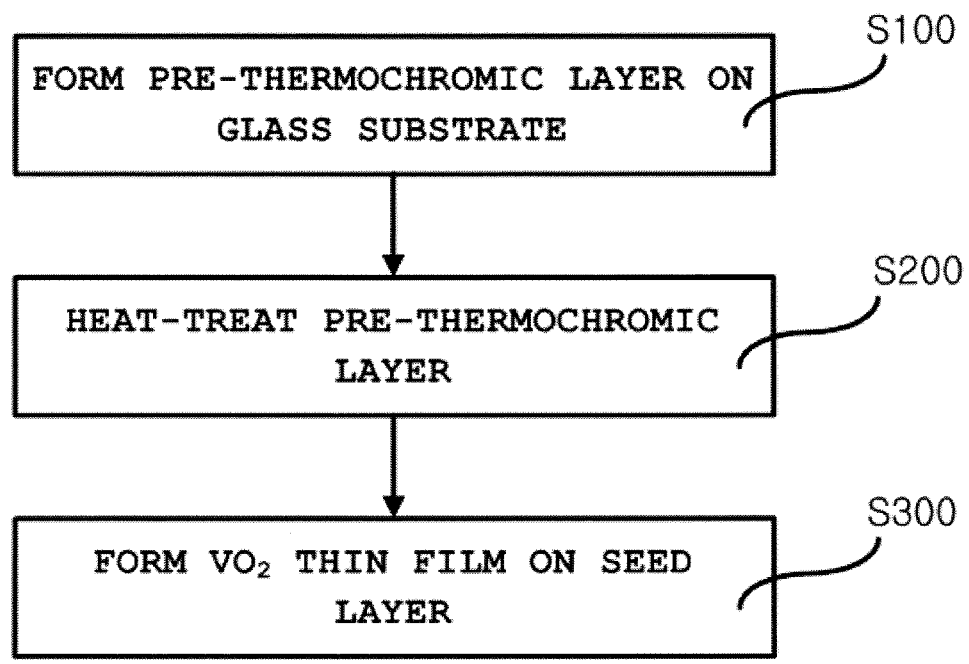
FIG. 1 is a flowchart schematically depicting a method of manufacturing a thermochromic substrate according to an exemplary embodiment of the invention.

Reference will now be made in detail to a thermochromic substrate and a method of manufacturing the same according to the present invention, examples of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

FIG. 1 is a flowchart schematically depicting a method of manufacturing a thermochromic substrate according to an exemplary embodiment of the invention.

Referring to FIG. 1, the method of manufacturing a thermochromic substrate according to an exemplary embodiment of the invention includes the step of forming a pre-thermochromic layer S100, the heat treatment step S200, and the step of forming a thermochromic layer S300.

In order to manufacture the thermochromic substrate, first, at step S100, a pre-thermochromic layer is formed on a glass substrate by coating the glass substrate with pure vanadium (V).

The glass substrate is a base material that is transparent or colored and has a predetermined area and thickness. It is preferred that the glass substrate be made of sodalime glass.

The step of coating with the pure V can be conducted by a variety of methods such as sputtering, preferably, direct current (DC) sputtering deposition.

Afterwards, at step S200, the pre-thermochromic layer made of V is heat-treated, so that V is converted into vanadium dioxide ($VO_2$) via phase transition.

The heat treatment can be performed in a vacuum atmosphere, preferably at a temperature ranging from 300° C. to 500° C. in a vacuum atmosphere, and more preferably at a temperature ranging from 300° C. to 500° C. for 10 to 60 minutes. Due to this processing, a seed layer made of $VO_2$ having excellent properties may be formed on the surface.

In addition, in the heat treatment step, a small amount of oxygen may be provided in order to facilitate the phase change of V into $VO_2$. Although the amount by which oxygen is provided may vary depending on the size and the strength of the vacuum in the heat treatment chamber, oxygen may be provided in an amount ranging, preferably, from 10 sccm to 100 sccm. It is further preferred that oxygen be provided in an amount ranging from 10 sccm to 50 sccm, such that pure V does not undergo phase change into vanadium pentoxide ($V_2O_5$) due to excessive blowing of oxygen.

The seed layer may be formed so that its thickness ranges from 5 nm to 10 nm. However, the reflectivity of V increases but the transmittance of V for visible light decreases due to the metallic characteristics of V. Therefore, it is further preferred if the seed layer is thinner.

Finally, in S300, a thermochromic layer is formed by coating the heat-treated seed layer with a $VO_2$ thin film, thereby producing a thermochromic substrate.

The step of coating the heat-treated seed layer with the $VO_2$ thin film may be performed via sputtering deposition using a sputtering target, which is composed of pure vanadium or a vanadium oxide. It is preferred that the coating step be performed via direct current (DC) sputtering deposition using a sputtering target, which is composed of pure vanadium or vanadium dioxide ($VO_2$) with which vanadium trioxide ($V_2O_3$) and vanadium pentoxide ($V_2O_5$) are mixed. Vanadium oxides other than the pure vanadium or the $VO_2$ with which the $V_2O_3$ and the $V_2O_5$ are mixed are nonconductors, and require radio frequency (RF) sputtering deposition in order to be applied as a coating on the glass substrate. In contrast, the pure vanadium or the $VO_2$ with which the $V_2O_3$ and the $V_2O_5$ are mixed is a conductor, and can be applied as a coating via DC sputtering deposition. In general, the DC sputtering deposition can provide deposition at a rate that is about five times as fast as the RF sputtering deposition.

When the seed layer with at least the surface thereof phase-changed into $VO_2$ is coated with pure vanadium or a vanadium oxide, vanadium metal can be deposited as the $VO_2$, which has the same crystalline phase as the seed layer, on the seed layer, thereby forming a thermochromic layer on the seed layer.

Figure 2:
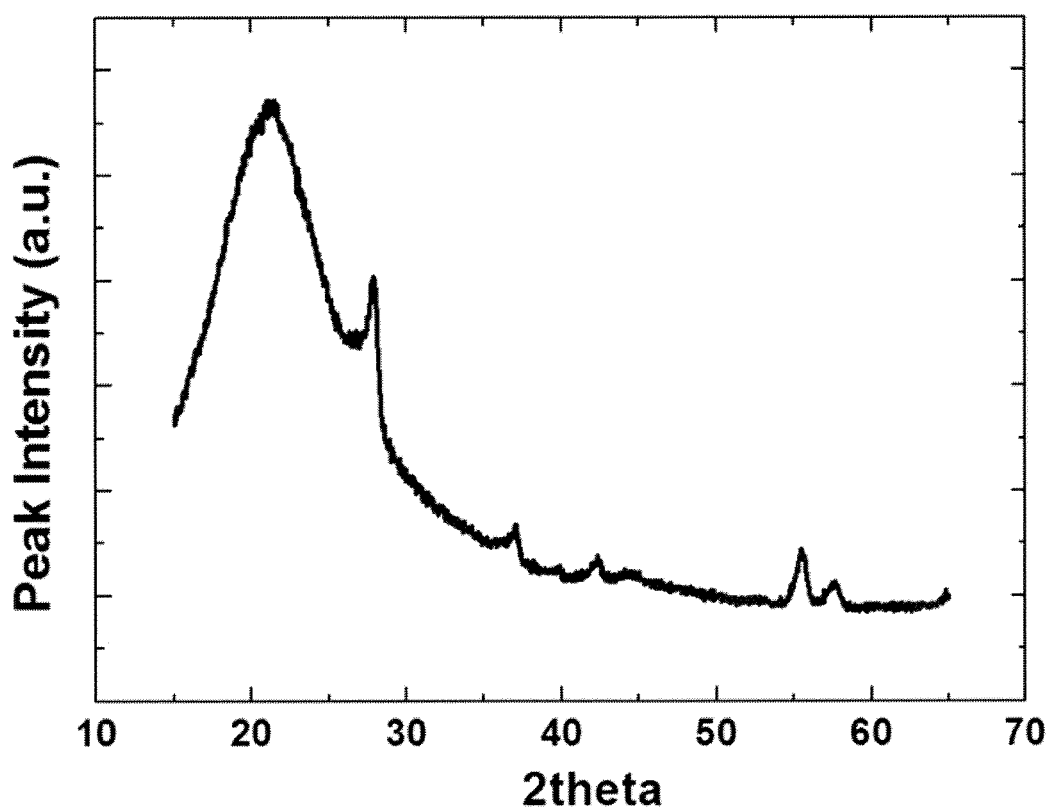
FIG. 2 is an XRD graph depicting a vanadium dioxide ($VO_2$) thin film, which is formed by a method of the related art.
Figure 3:
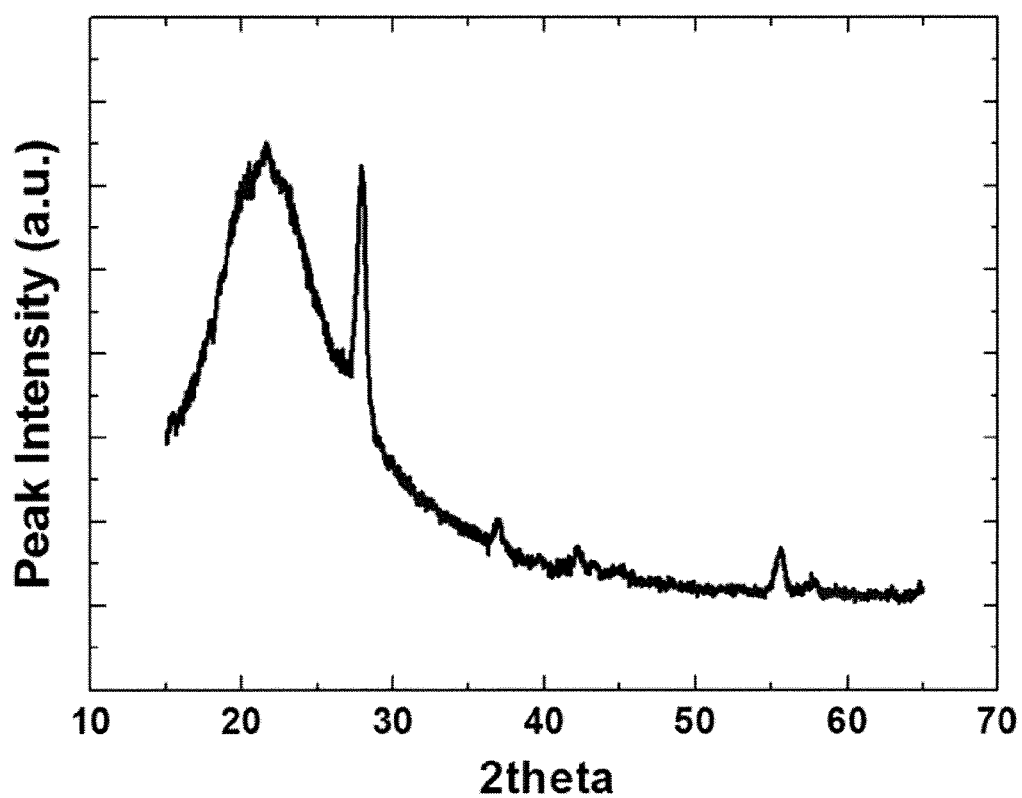
FIG. 3 is an XRD graph depicting a $VO_2$ thin film, which is formed according to an example of the invention.

FIG. 2 is an XRD graph depicting a $VO_2$ thin film, which is formed by a method of the related art, and FIG. 3 is an XRD graph depicting a $VO_2$ thin film, which is formed according to an example of the invention.

Comparing FIG. 2 and FIG. 3, it can be appreciated that a $VO_2$ thin film according to the example of the invention has a higher peak value than a $VO_2$ thin film of the related art at angles ranging from 25° to 30°. That is, the $VO_2$ thin film according to the invention has higher peak intensity.

Figure 4:
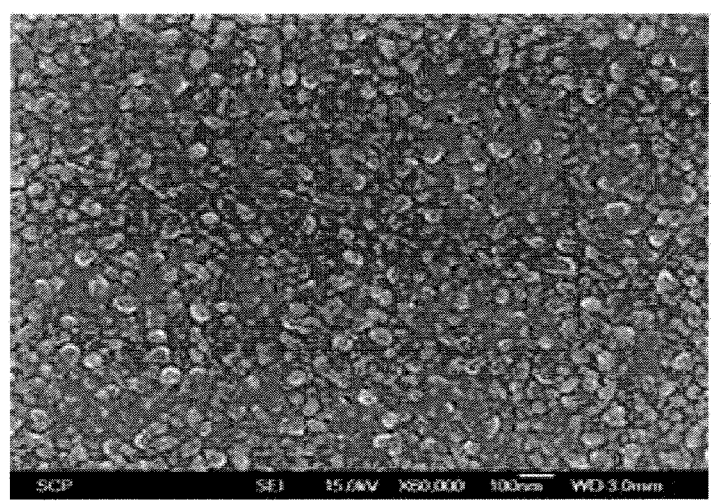
FIG. 4 is a picture obtained by photographing the crystallinity of a $VO_2$ thin film, which is formed by a method of the related art.
Figure 5:
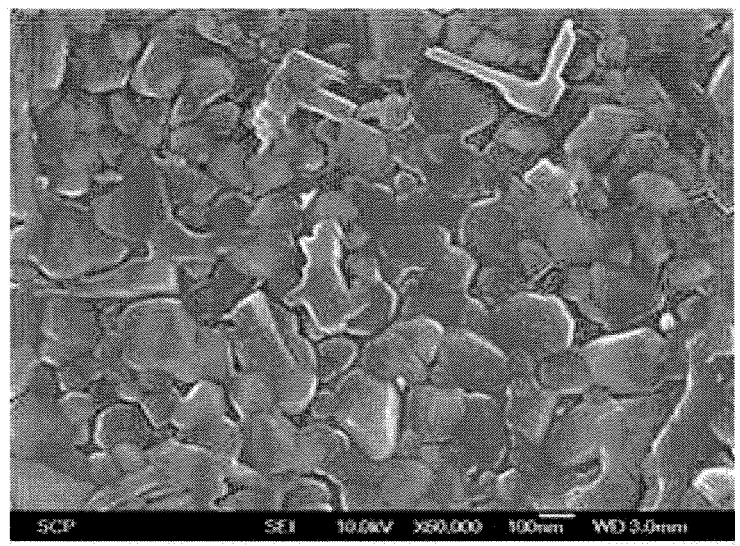
FIG. 5 is a picture obtained by photographing the crystallinity of a $VO_2$ thin film, which is formed by an example of the invention.

FIG. 4 is a picture obtained by photographing the crystallinity of a $VO_2$ thin film, which is formed by a method of the related art, and FIG. 5 is a picture obtained by photographing the crystallinity of a $VO_2$ thin film, which is formed according to an example of the invention.

Comparing FIG. 4 and FIG. 5, it can be appreciated that the crystallinity of the $VO_2$ thin film formed according to the example of the invention is superior to that of the $VO_2$ thin film formed by the method of the related art.

In this way, when the $VO_2$ thin film is formed after the seed layer is formed on a glass substrate, the lattice constant of the seed layer being the same as that of the $VO_2$ thin film and the interface characteristics of the seed layer being homogeneous with those of the $VO_2$ thin film, it is possible to improve the crystallinity and the long-term reliability of the $VO_2$ thin film.

In addition, since the seed layer acts as a sodium diffusion barrier to prevent sodium from diffusing from the glass substrate in a high-temperature process for forming the $VO_2$ thin film, it is possible to improve the thermochromic characteristics of the thermochromic substrate.

Furthermore, in the invention, it is possible to use sputtering targets made of a material of the same kind when forming the seed layer and when forming the thermochromic layer, thereby simplifying the process of manufacturing the thermochromic substrate.

Although $VO_2$ has been discussed as an example of the thermochromic substance, the foregoing disclosure of the invention can equivalently be applied to other thermochromic substances, such as titanium oxide (III) ($Ti_2O_3$), niobium oxide ($NbO_2$), nickel sulfide (NiS), or the like.

The foregoing descriptions of specific exemplary embodiments of the present invention have been presented with respect to the certain embodiments and drawings. They are not intended to be exhaustive or to limit the invention to the precise forms disclosed, and obviously many modifications and variations are possible for a person having ordinary skill in the art in light of the above teachings.

It is intended therefore that the scope of the invention not be limited to the foregoing embodiments, but be defined by the Claims appended hereto and their equivalents.

What is claimed is:

1. A method of manufacturing a thermochromic substrate, the thermochromic substrate comprising:
a base substrate;
a seed layer formed on the base substrate; and
a thermochromic layer formed on the seed layer, wherein the thermochromic layer comprises a thermochromic substance, and the seed layer is modified such that at least a surface thereof facing the thermochromic layer contains the thermochromic substance,
the method comprising:
forming a pre-thermochromic layer on the base substrate, the pre-thermochromic layer containing a pre-thermochromic substance;
forming the seed layer by heat-treating the pre-thermochromic layer; and
forming the thermochromic layer on the seed layer.

2. The method of claim 1, wherein the thermochromic substance comprises vanadium dioxide ($VO_2$).

3. The method of claim 2, wherein the pre-thermochromic substance comprises pure vanadium, wherein at least the surface of the pre-thermochromic layer is modified from the pure vanadium into the vanadium dioxide ($VO_2$) by heat-treating the pre-thermochromic layer.

4. The method of claim 1, wherein a thickness of the seed layer ranges from 5 nm to 10 nm.

5. The method of claim 1, wherein the pre-thermochromic layer is heat-treated in vacuum atmosphere.

6. The method of claim 1, wherein the pre-thermochromic layer is heat-treated in oxygen atmosphere.

7. The method of claim 6, wherein the oxygen is provided in an amount ranging from 10 sccm to 100 sccm.

8. The method of claim 1, wherein the pre-thermochromic layer is heat-treated at a temperature ranging from 300° C. to 500° C.

9. The method of claim 1, wherein the pre-thermochromic layer is heat-treated for 10 to 60 minutes.

10. The method of claim 1, wherein the thermochromic layer comprises vanadium dioxide ($VO_2$), wherein the thermochromic layer comprising the vanadium dioxide ($VO_2$) is formed by sputtering deposition using a sputtering target made of pure vanadium or a vanadium oxide.

11. The method of claim 1, wherein the thermochromic layer comprises vanadium dioxide ($VO_2$), wherein the thermochromic layer comprising the vanadium dioxide ($VO_2$) is formed by direction current (DC) sputtering deposition using a sputtering target made of pure vanadium or vanadium dioxide ($VO_2$) into which vanadium trioxide ($V_2O_3$) and vanadium pentoxide ($V_2O_5$) are mixed.

12. The method of claim 1, wherein the pre-thermochromic layer is formed at a temperature of 350° C. or less.

13. A method of manufacturing a thermochromic substrate, the thermochromic substrate comprising:
a base substrate;
a seed layer formed on the base substrate; and
a thermochromic layer formed on the seed layer, wherein the thermochromic layer comprises a thermochromic substance, and the seed layer is modified such that at least a surface thereof facing the thermochromic layer contains the thermochromic substance,
the method comprising:
forming a pre-thermochromic layer on the base substrate, the pre-thermochromic layer containing a pre-thermochromic substance;
forming the seed layer by oxidizing the pre-thermochromic layer; and
forming the thermochromic layer on the seed layer.

14. The method of claim 13, wherein the thermochromic material comprises vanadium dioxide ($VO_2$).

* * * * *